(12) United States Patent
Doran et al.

(10) Patent No.: US 7,929,462 B1
(45) Date of Patent: Apr. 19, 2011

(54) FLOOR CONTROL IN A FULL-DUPLEX PACKET-BASED REAL-TIME MEDIA SESSION

(75) Inventors: Christopher M. Doran, Sunnyvale, CA (US); Ryan H. Hodgson, Discovery Bay, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 89 days.

(21) Appl. No.: 12/144,204

(22) Filed: Jun. 23, 2008

Related U.S. Application Data

(63) Continuation of application No. 10/636,012, filed on Aug. 7, 2003, now Pat. No. 7,408,890.

(51) Int. Cl.
*H04L 12/16* (2006.01)

(52) U.S. Cl. ......... 370/260; 370/437; 370/447; 455/519

(58) Field of Classification Search .................. 370/261, 370/437, 442, 447, 260, 61; 455/518, 519
See application file for complete search history.

(56) References Cited

U.S. PATENT DOCUMENTS

| 3,601,530 | A * | 8/1971 | Edson et al. ................. 348/14.1 |
| 2003/0119536 | A1 * | 6/2003 | Hutchison ..................... 455/517 |

* cited by examiner

*Primary Examiner* — Seema S Rao
*Assistant Examiner* — Mon Cheri S Davenport

(57) ABSTRACT

A method and server are disclosed for providing floor control in a full-duplex communication session. When no participant currently holds the floor, a server grants the floor in response to receipt of a media stream from a participant, by outputting the participant's media more loudly than one or more other participants' media, while concurrently outputting media from multiple participants. Further, the server may grant levels of the floor with varying levels of loudness, perhaps based on an order in which the server receives media streams as implicit floor requests from the various participants.

19 Claims, 12 Drawing Sheets

FLOOR CONTROL IN A FULL-DUPLEX PACKET-BASED REAL-TIME MEDIA SESSION

REFERENCE TO RELATED APPLICATION

This is a continuation of U.S. patent application Ser. No. 10/636,012, filed Aug. 7, 2003, the entirety of which is hereby incorporated by reference.

BACKGROUND

1. Field of the Invention

The present invention relates to network communications and, more particularly, to the management of packet-based real-time media sessions.

2. Description of Related Art

As a general matter, it is known to establish a real-time media conference over a packet-switched network between multiple user stations, each operated by a respective user. A communication server, such as a multipoint conference unit (MCU) for instance, can reside functionally in the network and can operate as a bridging or switching device between the participating stations, to support the conference session.

In practice, a participating station might initiate the conference session by sending to the communication server a session setup message that identifies the other desired participant(s). In response, the server may then seek to connect each of the designated other participants, such as by forwarding the session setup message or sending a new session setup message to each other party. Ultimately, the server would thereby establish a conference leg with each participating station, including the initiating station, and the server would then bridge together the legs so that the users at the stations can confer with each other, exchanging voice, video and/or other media in real-time via the server.

A signaling mechanism such as the well known Session Initiation Protocol (SIP) could be used to initialize the conference and more particularly to set up each conference leg. Further, digitized media could be packetized and carried between each participating station according to a mechanism such as the well known Real-time Transport Protocol (RTP), for instance. The core industry standards for SIP (Internet Engineering Task Force (IETF) Request For Comments (RFC) 2543) and RTP (IETF RFC 1889) are hereby incorporated by reference.

Packet based media conferencing can be advantageously employed to provide an "instant connect" service, where a user of one station can readily initiate a real-time media conference with one or more designated target users at other stations. The initiating user may simply select a target user or group and then press an instant connect button on his or her station, and the user's station would responsively signal to a communication server to initiate a conference between the initiating user and the selected user or group. This sort of service is referred to as "instant connect" because it strives to provide a quick connection between two or more users, in contrast to telephone service where a user dials a telephone number of a party and waits for a circuit connection to be established with that party.

An example of an instant connect service is commonly known as "push-to-talk" (PTT). In a PTT system, some or all of the conference stations are likely to be wireless devices such as cellular mobile stations, that are equipped to establish wireless packet-data connectivity and to engage in voice-over-packet (VoP) communication. Alternatively, some or all of the stations could be other sorts of devices, such as multi-media personal computers or Ethernet-telephones, that can establish packet data connectivity and engage in VoP communication through landline connections. Further, each station could be equipped with a PTT button or other mechanism that a user can engage (actuate) in order to initiate an PTT session or to request the floor during an ongoing session.

In practice, a user of a PTT-equipped mobile station might select a target user or group of users from a contact list or other program menu and engage the PTT button to initiate a conference session with that user or group. In response, the mobile station may then send a session initiation message to the communication server, to set up a conference session in the manner described above for instance, and the user could begin talking with the other users. Further, a similar mechanism could be applied to establish real-time media conferences carrying video or other media as well.

A conferencing system could be designed to provide either full-duplex service or half-duplex service. In a full-duplex system, a participating station would be allowed to send and receive media at the same time, so that a user of the station could both talk and listen at once. In order to accommodate full-duplex operation, a communication server would be configured to receive media from multiple stations at once and to output to each station a mixture of the media or some representative subset of the media (e.g., a strongest signal).

In a half-duplex system, on the other hand, a participating station would at any time be allowed to either send media to the server or receive media from the server, but would be precluded from sending and receiving concurrently. In order to accommodate half-duplex operation, a communication server would be configured to apply a floor-control process, according to which the server allows only one station to have the floor at once. Thus, in a half-duplex mode, a participating station would receive media from only the handset that has the floor.

In a typical floor control process, a participant must request permission to "speak" (i.e., to send voice or other media) by sending a "floor-request" message to the server. The server then replies with a message that either grants or denies the floor. Once the server grants the floor to a participant, the server blocks all other participants from speaking (by denying all floor requests) until the speaker sends a "floor-relinquish" message to the server and the server acknowledges. Upon relinquishment of the floor, the server would then send a "floor-relinquished" message to all participants and the participants would acknowledge. Only after this entire sequence has been completed will any other participant be allowed to speak.

Unfortunately, however, these floor control message exchanges can introduce delay into the communication process. Consequently, an improved floor control process is desired.

OVERVIEW

Disclosed herein is a floor control method for a full-duplex packet-based real-time media session in which a plurality of user stations exchange media via a communication server on a packet-switched network. According to the method, in the full-duplex packet-based real-time media session, the communication server outputs media from more than one of the user stations concurrently, to allow session participants to talk and listen at the same time, and the communication server grants a floor of the session to just one of the user stations at a time, so that just the one user station holds the floor at a time, wherein granting the floor to just one of the user stations at a time comprises outputting media more loudly from the one user station than from each other participating user station.

Likewise, disclosed herein is a communication server operable to provide floor control for a full-duplex packet-based real-time media session in which a plurality of user stations exchange media via the communication server on a packet-switched network. The communication server comprises a processor, a communication interface, data storage, and machine language instructions stored in the data storage and executable by the processor to carry out various functions. The machine language instructions are be executable to output media from more than one of the user stations concurrently, to allow session participants to talk and listen at the same time. Further, the machine language instructions are be executable to receive a media stream from a given user station of the plurality of user stations, and in response, to grant a floor of the session to the given user station if no other participating station currently holds the floor, and to refuse to grant the floor to the given user station if another participating station currently holds the floor, wherein granting the floor to the given user station comprises outputting media more loudly from the given user station than from each other participating user station, while still outputting media from one or more other participating user stations.

Further disclosed is an implicit floor control method for a full-duplex packet-based real-time media session in which a plurality of user stations exchange media via a communication server on a packet-switched network. According to the implicit floor control method, in the full-duplex packet-based real-time media session, the communication server grants levels of floor to two or more user stations in response to receipt of media streams from the user stations and based on an order in which the communication server begins to receive the media streams from the user stations. In this regard, granting levels of floor to two or more user stations comprises granting a highest floor level to a first user station from which the communication server receives a media stream and granting a next floor level to a next station from which the communication server receives a media stream when the first user station currently holds the highest floor level, so that multiple stations concurrently hold levels of the floor.

BRIEF DESCRIPTION OF THE DRAWINGS

An exemplary embodiment of the present invention is described herein with reference to the drawings, in which.

DETAILED DESCRIPTION

1. Example Network Architecture a. General

Figure 1:
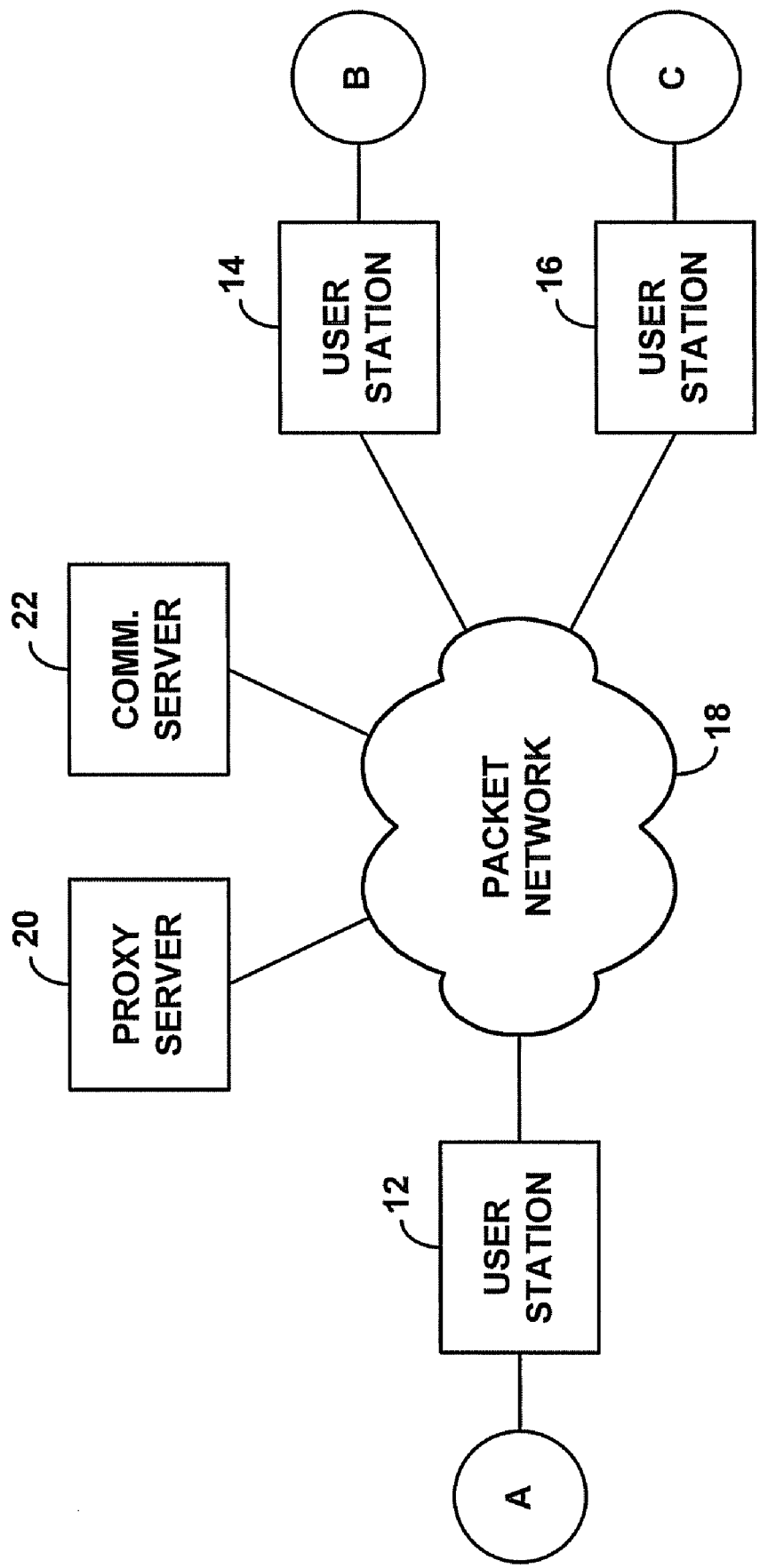
FIG. 1 is a block diagram of a communication system in which the exemplary embodiment can be employed.

Referring to the drawings, FIG. 1 illustrates a communication system 10 in which an exemplary embodiment of the present invention can be employed. For simplicity and by way of example, FIG. 1 depicts three user stations 12, 14, 16 coupled with a common packet-switched network 18. User station 12 is operated by user A, user station 14 is operated by user B, and user station 16 is operated by user C. Sitting on the packet network 18, by way of example, are then a proxy server 20 and a communication server 22.

It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

In the arrangement of FIG. 1, each user station 12, 14, 16 is preferably equipped with hardware and logic to establish network connectivity, to set up and engage in packet-based real-time media conferences via server 22 and to engage in implicit floor control.

Figure 2:
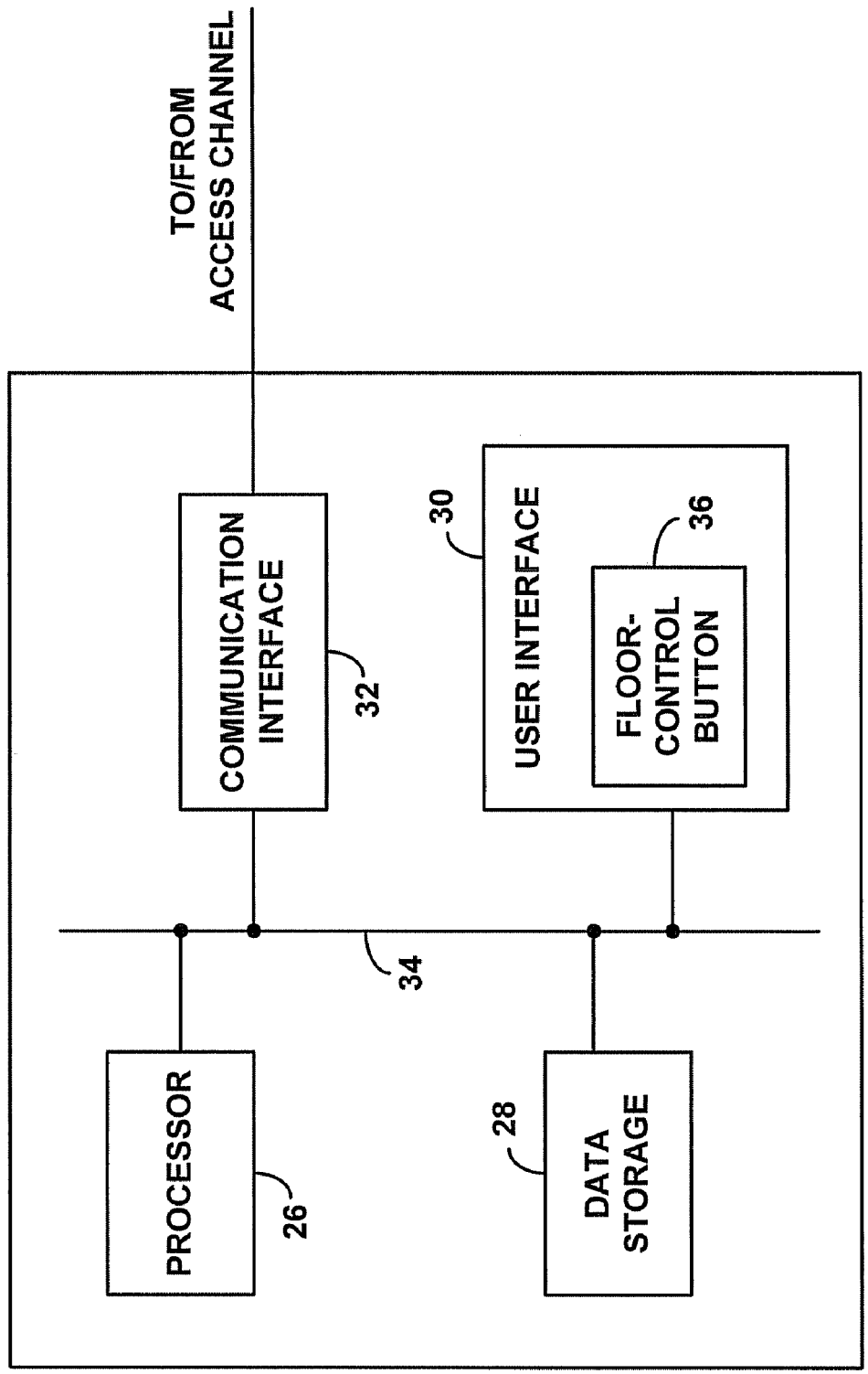
FIG. 2 is a block diagram of an exemplary user station.

FIG. 2 is a block diagram showing some of the components that an exemplary user station could contain in order to carry out these functions. As shown in FIG. 2, the exemplary user station includes a processor 26, data storage 28, a user interface 30, and a communication interface 32, all of which may be coupled together by a system bus or other mechanism 34.

Each of these components may take various forms, the particular details of which are not necessarily critical. For instance, processor 26 may be one or more general purpose microprocessors (e.g., Intel Pentium class processors) or dedicated processors, either of which could integrate part or all of data storage 28. And data storage 28 may be volatile and/or non-volatile storage (such as RAM, flash memory and/or a storage drive).

User interface 30 may facilitate interaction with a user. As such, the user interface may include media input and output mechanisms. To facilitate voice communications, for instance, these mechanisms might include a microphone (not shown) for receiving analog speech signals from a user, and a speaker (not shown) for playing out analog speech signals to a user. (Further, the mobile station will likely include digital/analog conversion circuitry (not shown) for converting between analog media signals and digital representations of those signals.)

In addition, the user interface 30 may include a display, speaker or other mechanism (not shown) for presenting information and menus to a user, as well as an input mechanism (e.g., keyboard, keypad, microphone, mouse, and/or touch-sensitive display overlay) (not shown) for receiving input from a user. To facilitate floor control, the input mechanism may also include a floor-control button 36 or other mechanism that a user can readily engage in order to request the floor in an ongoing session.

Communication interface 32, in turn, facilitates communication through an access channel to packet network 18. The communication interface may thus vary in form depending on the type of connection through which the station will communicate. For instance, if the station is coupled through a wired Ethernet connection to the network, then communication interface 34 might be a conventional Ethernet module. As another example, if the station is coupled through a wireless Ethernet or other radio access link to the network, then the communication interface might include a suitable chipset and antenna for communicating according to a designated air interface protocol.

In the exemplary embodiment, data storage 28 may hold program logic, such as machine language instructions, that can be executed by processor 26 to carry out various functions described herein. (Alternatively or additionally, the exemplary station could include hardware and/or firmware to carry out these functions.)

For example, to facilitate packet-data communications over network 18, the logic may define a conventional IP stack. As another example, to facilitate setting up and tearing down communication sessions, the logic may define a SIP user agent client application that enables processor 26 to engage in conventional SIP messaging.

As still another example, to facilitate real-time media communication, the logic may define an RTP client application compliant with RFC 1889. And the logic may enable processor 26 to receive media signals from user interface 30 and to encode and packetize outgoing media as RTP/UDP/IP packets for transmission via communication interface 32 for receipt by server 22. Similarly, the logic may enable processor 26 to depacketize and decode incoming media signals provided by communication interface 32 from server 22 and to pass the decoded signals to user interface 32 for playout to a user.

In accordance with the exemplary embodiment, the logic may then further define mechanics for engaging in implicit floor-control as presently contemplated. In particular, the logic may define mechanics for implicitly requesting the floor and for handling an implicit denial of the floor. For instance, when a user requests the floor, the logic may cause processor 26 to begin receiving media from the user and sending the media in an outgoing RTP stream to the server 22. And if the processor detects a user floor request at the same time as an incoming RTP stream from server 22, the logic may cause the processor to treat the incoming RTP stream as a floor denial and to notify the user accordingly. Further details of this process will be described below.

Referring back to FIG. 1, communication server 22 is preferably equipped with hardware and logic to establish network connectivity, to set up and support packet-based real-time media conferences, and to engage in implicit floor control.

Figure 3:
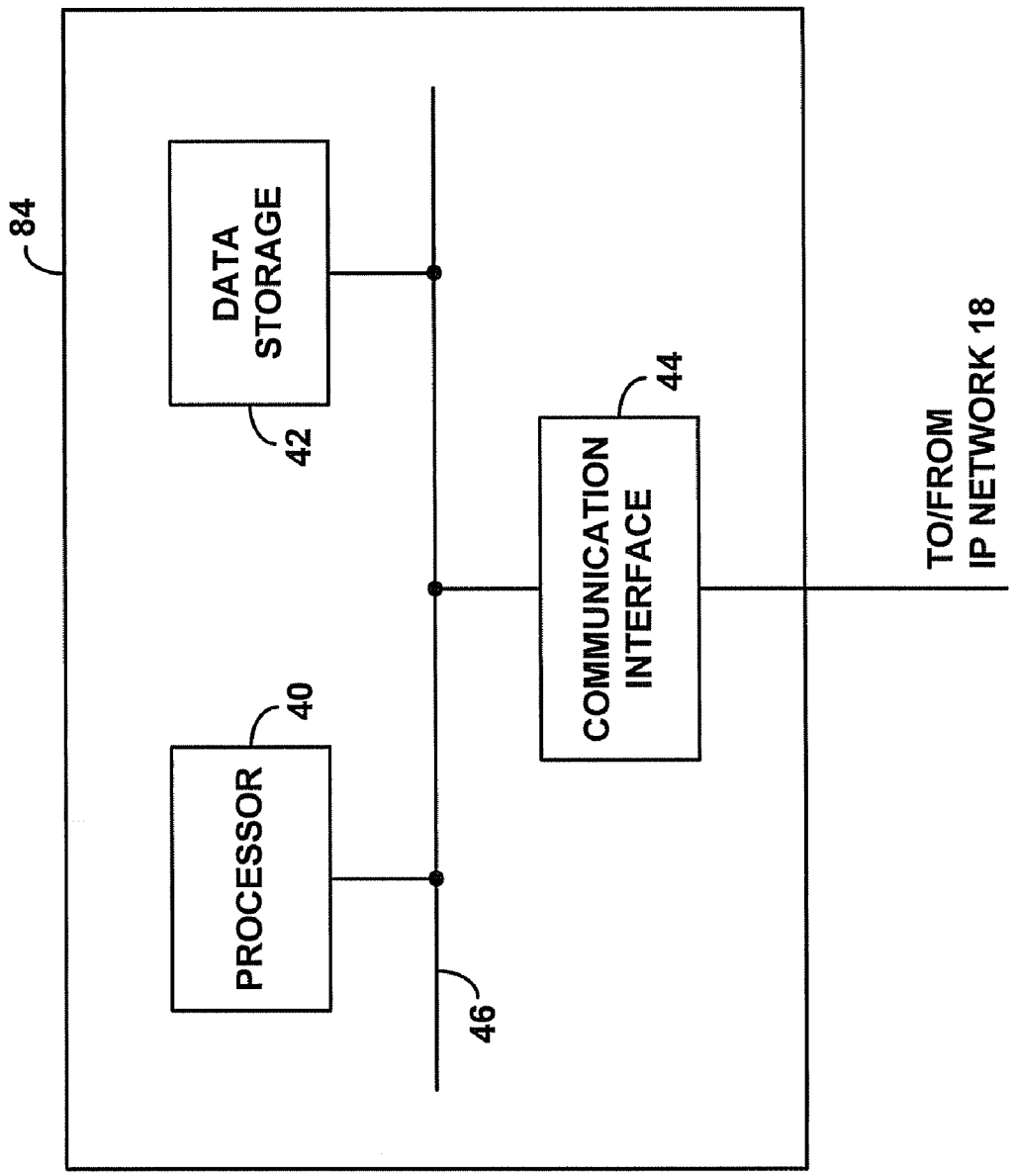
FIG. 3 is a block diagram of an exemplary communication server.

FIG. 3 is a block diagram showing some of the components that an exemplary communication server 22 could contain in order to carry out these functions. As shown in FIG. 3, the exemplary server 22 includes a processor 40, data storage 42, and a communication interface 44, all of which could be coupled together by a system bus or other mechanism 46.

As in the exemplary user station, each of these components may take various forms, the particular details of which are not necessarily critical. For instance, processor 40 may be one or more general purpose microprocessors (e.g., Intel Pentium class processors) or dedicated processors, either of which could integrate part or all of data storage 28. And data storage 42 may be volatile and/or non-volatile storage (such as RAM, flash memory and/or a storage drive).

Communication interface 44 functions to provide connectivity with network 18. Like that in the exemplary user station, communication interface 44 may thus take various forms depending on the form of the link between the server 22 and network 18. By way of example, the communication interface 44 could be a wired or wireless Ethernet module.

Data storage 42, in turn, may hold program logic, such as machine language instructions, that can be executed by processor 40 to carry out various functions described herein. (Alternatively or additionally, the exemplary server 22 could include hardware and/or firmware to carry out these functions.)

Like the exemplary user station, for example, the logic may define a conventional IP stack to facilitate packet-data communications over network 18 and a SIP user agent client application to facilitate SIP messaging. The logic will also preferably define an RTP client application compliant with RFC 1889, as well as functionality to receive and forward RTP media streams.

Further, in the exemplary embodiment, the logic will further define mechanics for engaging in implicit floor-control as presently contemplated. In particular, the logic may define mechanics for granting the floor in response to an implicit floor request from a participating station, and for implicitly denying (i.e., ignoring) a floor request if another participant already has the floor. Further details of this process will be described below.

Additionally, data storage 42 would preferably hold a record of which, if any, station currently holds the floor at any moment. Thus, when server 22 grants the floor to a given station, processor 40 could record in data storage 42 that the station holds the floor.

b. Example Push-to-Talk Architecture

The arrangement shown in FIG. 1 can generally represent any sort of communication system in which multiple stations can engage in packet-based real-time media communication with each other via a communication server. Regardless of how the participating endpoints gain network connectivity, the implicit floor control process of the exemplary embodiment can help streamline management of a half-duplex communication session.

Figure 4:
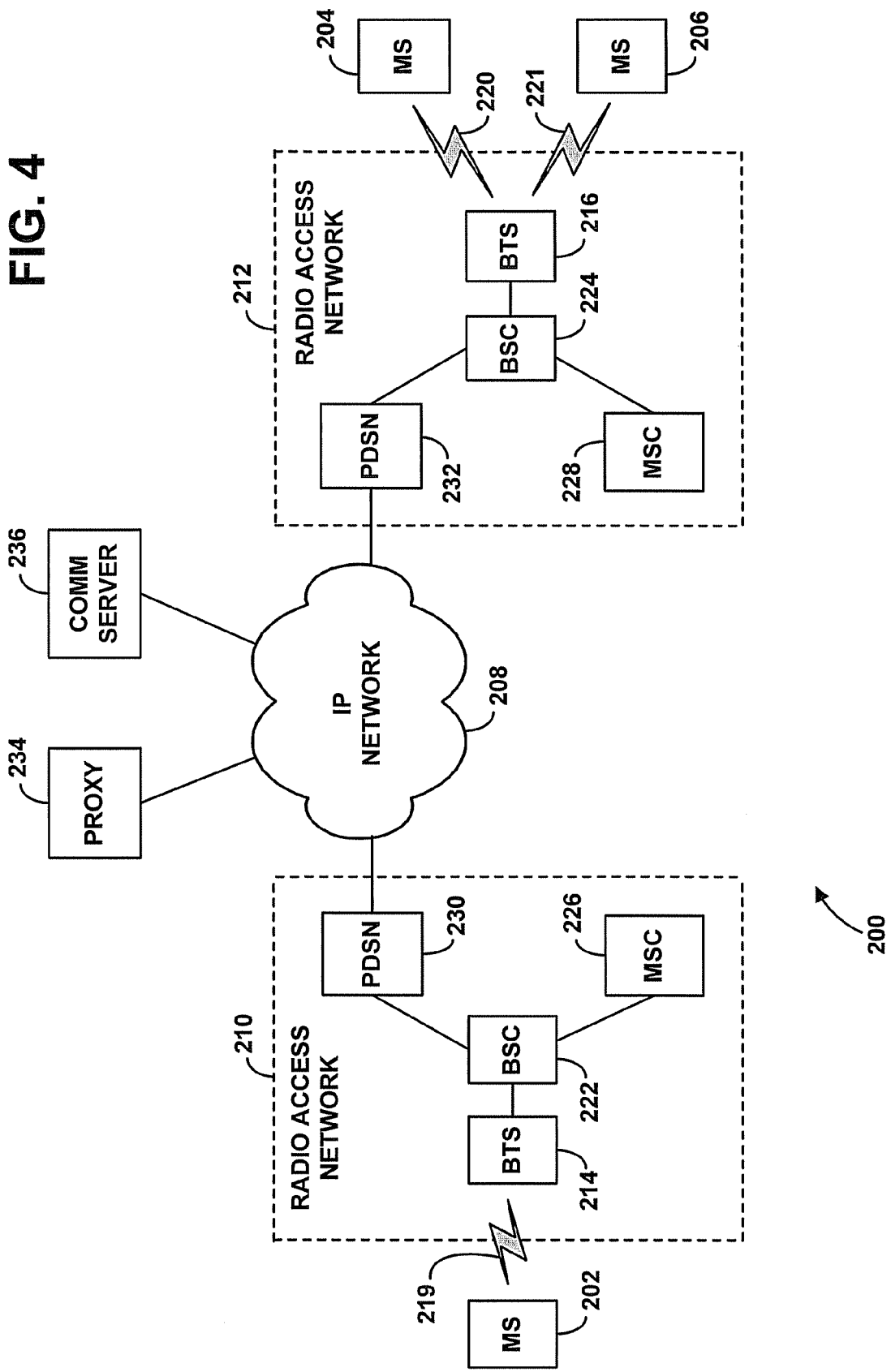
FIG. 4 is a block diagram of a wireless push-to-talk system.

By way of example, FIG. 1 can represent a wireless PTT system, in which some or all of the user stations are wireless devices such as cellular mobile stations for instance. FIG. 4 illustrates the arrangement of such a system 200.

As shown in FIG. 4, the user stations are shown as cellular mobile stations 202, 204, 206. Each mobile station is served by a radio access network with an IP network 208. In particular, mobile station 202 is shown linked by a first radio access network 210 with the IP network, and mobile stations 204, 206 are shown linked by a second radio access network 212 with the IP network. Alternatively, each mobile station can be served by a separate radio access network, or all could be served by a common radio access network.

Each radio access network could take various forms, and the radio access networks may or may not be the same as each other. In the example shown in FIG. 2, both radio access networks have the same configuration. In particular, each radio access network includes a base transceiver station (BTS) 214, 216 that can communicate with mobile stations over an air interface 219, 220, 221. Each BTS is then coupled with a base station controller (BSC) 222, 224, which may in turn be coupled with a mobile switching center (MSC) 226, 228 and with a packet data serving node (PDSN) 230, 232 or other gateway to the IP network 208. Other arrangements are possible as well.

Each mobile station may acquire radio connectivity and IP network connectivity in a manner well known in the art. For instance, applying well known "3G" recommendations, a mobile station may send an origination request over an air interface access channel to its MSC, and the MSC may forward the request back to the BSC. The BSC may then direct the mobile station to operate on a given traffic channel over the air interface. Further, the BSC may forward the request to the PDSN, and the PDSN may work with the mobile station to set up a data link, such as a point-to-point protocol (PPP) session between the mobile station and the PDSN. The PDSN may also assign a mobile-IP address to the mobile station, to allow the mobile station to engage in IP-network communications.

The air interface between each mobile station and its BTS preferably complies with an accepted protocol, examples of which include CDMA, TDMA, GSM and 802.11x. In the exemplary embodiment, for instance, the air interface protocol can be cdma2000, which is published by the 3rd Generation Partnership Project 2. Each mobile station may therefore be a 3G mobile station that is equipped to acquire wireless packet-data connectivity in a manner well known in the art.

Each mobile station is also preferably equipped to engage in SIP and RTP communication like the user stations described above. And each mobile station preferably includes a PTT button and associated logic, to allow a user to request the floor during an ongoing session.

Further illustrated as nodes on IP network 208 are then a proxy server 234 and communication server 236, which are analogous to the proxy server 20 and communication server 22 in FIG. 1.

2. Example Operation a. Session Setup

Figure 5:
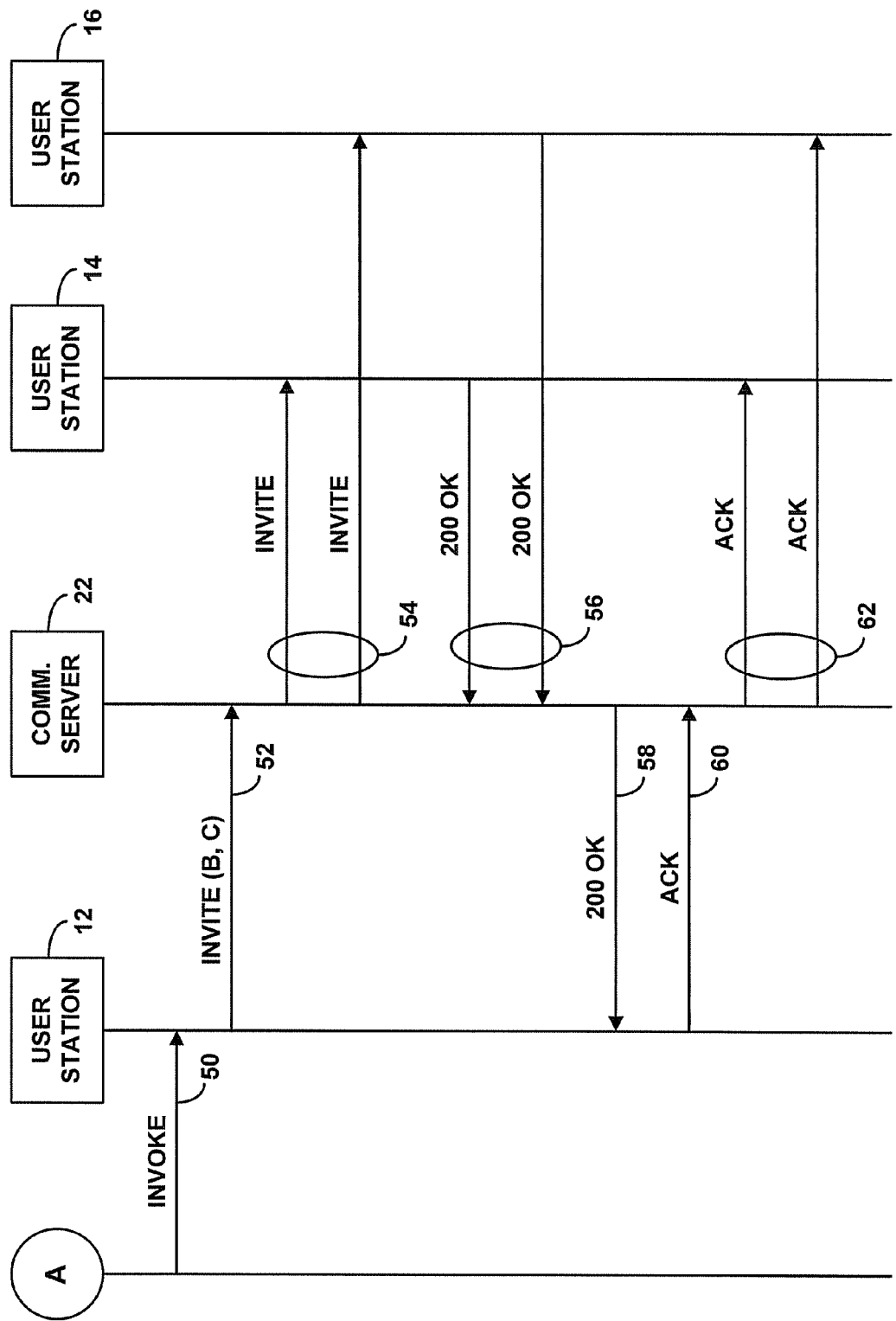
FIG. 5 is a message flow diagram depicting setup of a packet-based real-time media conference.

The implicit floor-control process assumes that a packet-based real-time media session exists between two or more participating stations via a communication server. FIG. 5 is a message flow diagram depicting an example of how such a session could be set up in the arrangement of FIG. 1. It should be understood, however, that any other session setup process could be used instead.

As shown in FIG. 5, at step 50, user A directs station 12 to initiate a packet-based real-time media session (e.g., PTT session) with users B and C. For this purpose, the floor-control button 36 on station 12 might also function as a session initiation button. So user A might engage that button.

At step 52, in response to the request from user A, station 12 sends a SIP INVITE to proxy server 20 for transmission in turn to server 22. The INVITE preferably designates users B and C (or stations 14 and 16) or designates a group ID that server 22 can translate into users B and C (or stations 14 and 16).

At step 54, upon receipt of the INVITE, server 22 sends an INVITE to each target participant A and B, in an effort to set up an RTP conference leg with each target participant. At step 56, upon receipt of the INVITE from server 22, each target station signals its agreement to participate, by sending a SIP "200 OK" message to server 22. At step 58, when the server 22 receives those messages, the server signals its agreement to participate by sending a 200 OK to station 12.

At step 60, station 12 then sends a SIP "ACK" message to server 22, to complete signaling for setup of an RTP leg between station 12 and server 22. And at step 62, server 22 then sends an ACK to each target station to complete signaling for setup of an RTP leg between the server 22 and the target station. With the legs thus established, server 22 may then begin bridging communications between the participating stations.

To begin with, station 12 may have the floor as a result of the fact that station 12 initiated the session. To facilitate a discussion of the implicit floor control process, assume that station 12 then relinquishes the floor, through express or implicit signaling with server 22. Thus, a packet-based real-time media session exists between stations 12, 14, 16 via server 22, and implicit floor control may proceed.

b. Implicit Floor Control at a User Station

As explained above, an exemplary user station will be arranged to carry out implicit floor control by sending implicit floor-requests and by detecting and responding to implicit floor denials. FIGS. 6-10 depict examples of these processes, which could be carried out by station 12, 14 or 16 in FIG. 1.

Figure 6:
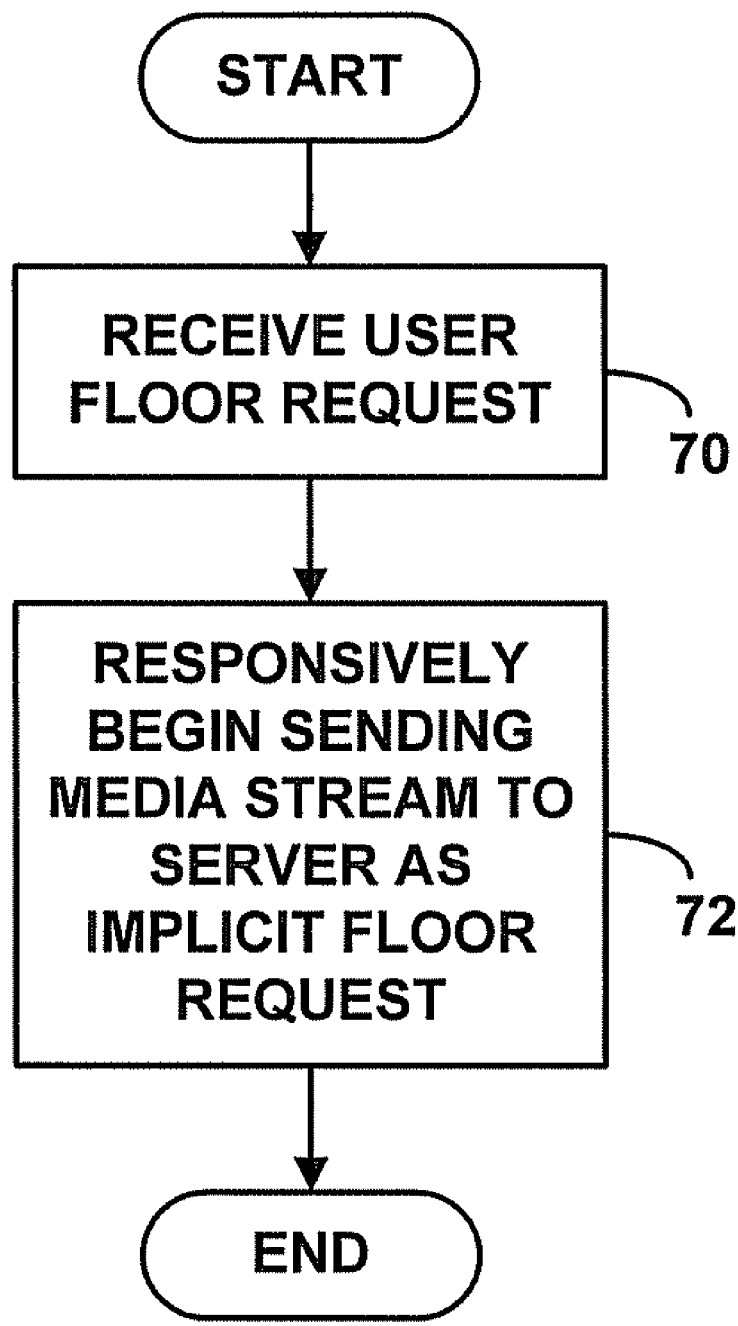
FIGS. 6-10 are flow charts depicting functions that an exemplary user station can carry out in accordance with the exemplary embodiment.

Referring first to FIG. 6, a basic implicit floor request process is shown. At step 70, the station receives a floor-request from a user. For instance, the user may engage in the floor-control button 36 or otherwise interact with user interface 30 to signal a request to begin "talking" (sending voice and/or other media), which the processor 26 would detect. For example, processor 26 could receive an interrupt when the user presses the floor-control button 36. In response, at step 72, the station begins sending an RTP stream representing media to server 22, as an implicit floor request. For instance, processor 26 may begin receiving voice from the user, digitizing and encoding the voice, and sending a digital representation of the voice in an outgoing RTP stream to server 22.

If the exemplary station is receiving an incoming RTP stream from server 22 at the time the user requests the floor, the station may still carry out the basic process of FIG. 5. Alternatively, in that scenario, the station may consider the incoming RTP stream an implicit denial of the user's floor request. This latter process is illustrated by FIG. 7.

Figure 7:
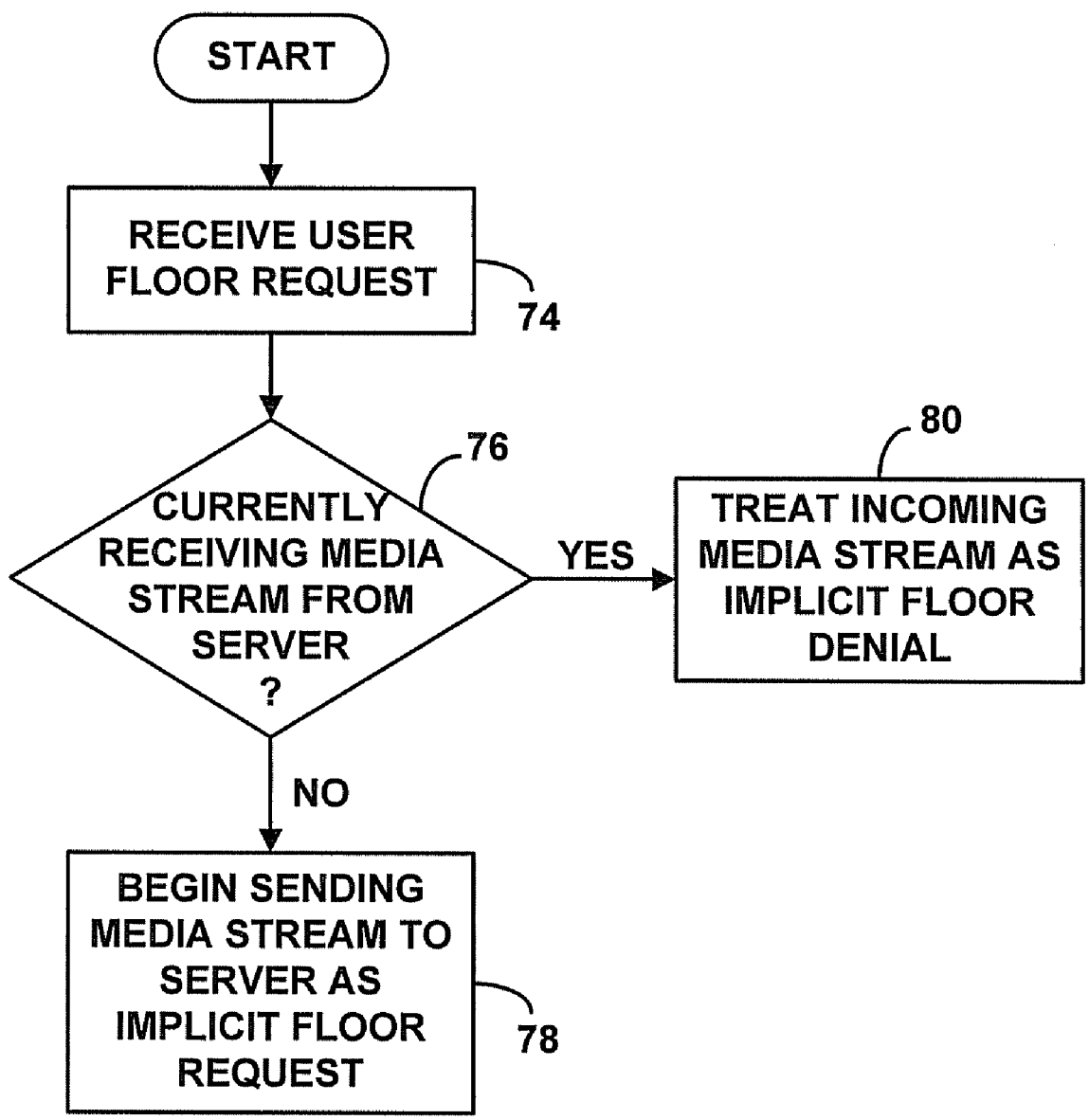

As shown in FIG. 7, at step 74, the station receives a floor request from the user. In response, at step 76, the station determines whether it is currently receiving an incoming RTP stream from the server 22. If it is not receiving an incoming RTP stream from the server, then, at step 78, the station begins sending an RTP stream representing media to server 22. On the other hand, if it is receiving an incoming RTP stream from the server, then, at step 80, it may treat the incoming RTP stream as an implicit floor denial, i.e., as an indication that someone else already has the floor.

Figure 8:
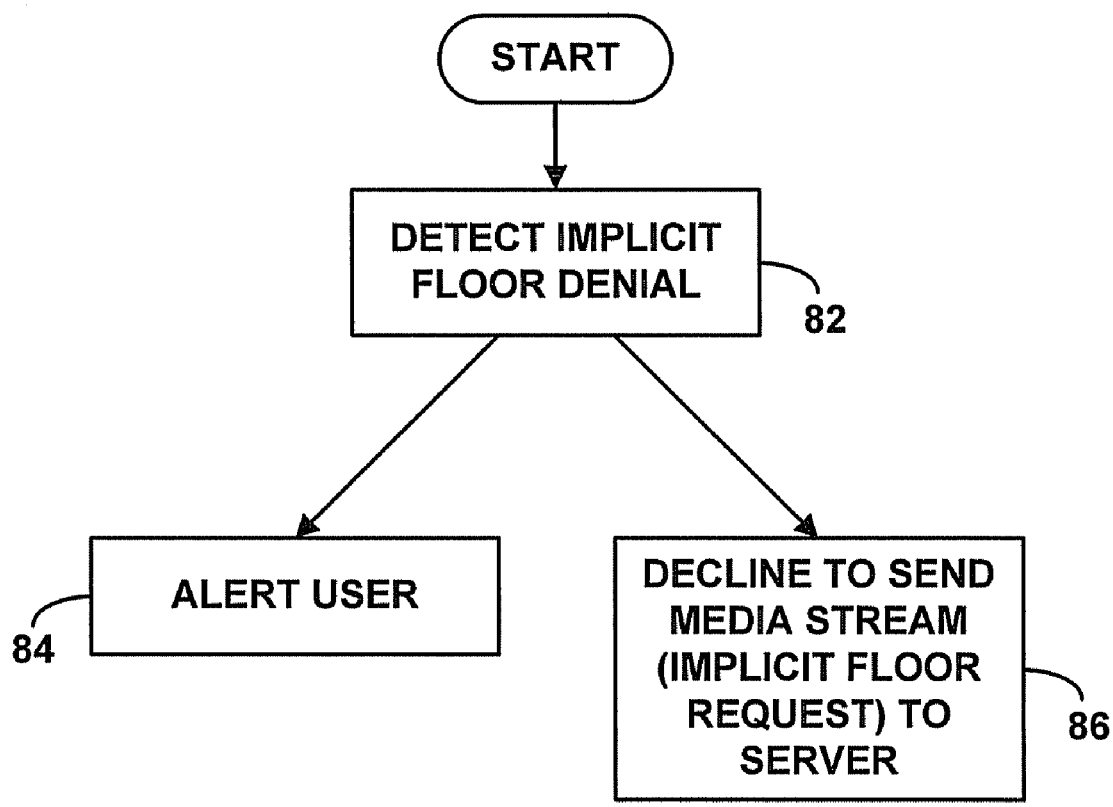

In the exemplary embodiment, when a station detects an implicit floor denial like this, the station can notify the user that the floor has been denied, and the station would preferably decline to send media to the server until the floor is released. FIG. 8 depicts an example of this process, where the station takes both of these actions in response to an implicit floor denial.

As shown in FIG. 8, at step 82, the station first detects an implicit floor denial. In response, at step 84, the station alerts the user who requested the floor. For instance, the station may notify the user through an audible, visual or vibratory alert via user interface 30. As a specific example, the station may beep and present a display screen message that indicates another participant has the floor. Also in response, at step 86, the station declines to send media to the server, i.e., declines to send an implicit floor request to the server.

Figure 9:
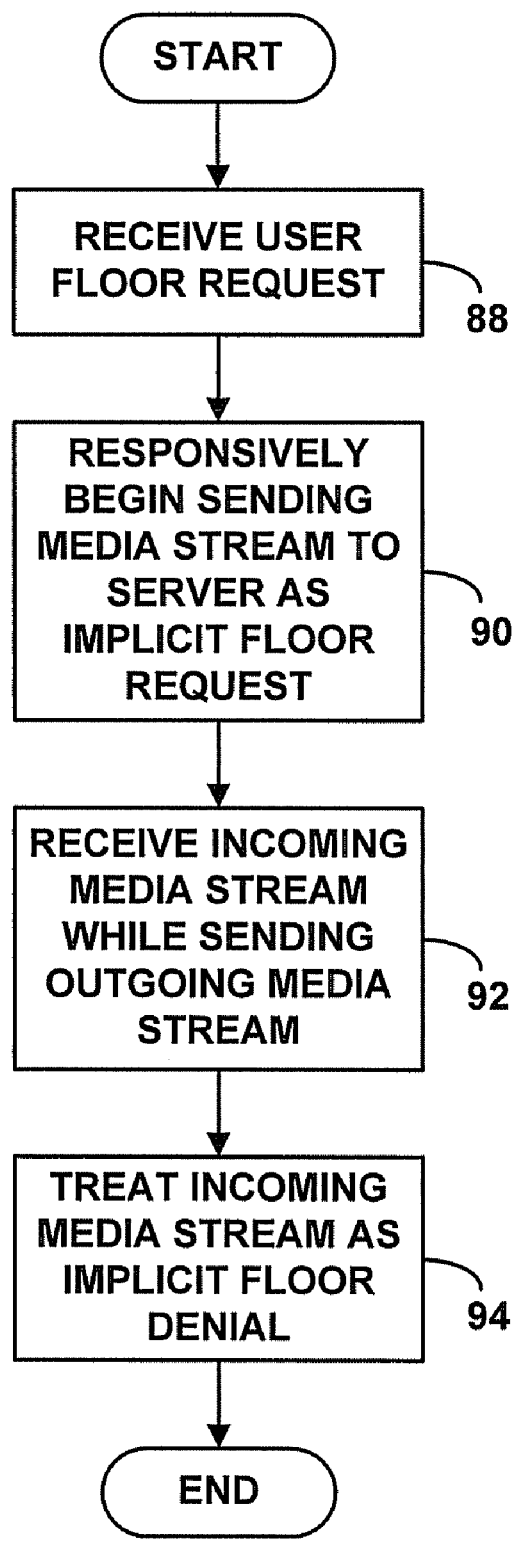

On the other hand, it is also possible that the station could begin receiving an incoming RTP stream from the server 22 while the station is sending media to the server. This could occur in a race scenario, for instance, where a station implicitly requests the floor before starting to receive media that the server just began receiving from another station. In that case, the station will preferably treat the incoming RTP stream as an implicit floor denial. FIG. 9 depicts this process.

As shown in FIG. 9, at step 88, the station receives a floor request from a user. At step 90, as in FIG. 6, the station responsively begins sending an outgoing RTP stream to the server 22. At step 92, while the station is sending the outgoing RTP stream to the server, the station receives an incoming RTP stream to the server. In accordance with the exemplary embodiment, at step 94, the station would treat the incoming RTP stream as an implicit denial of the floor request, i.e., as an indication that someone else already has the floor.

Figure 10:
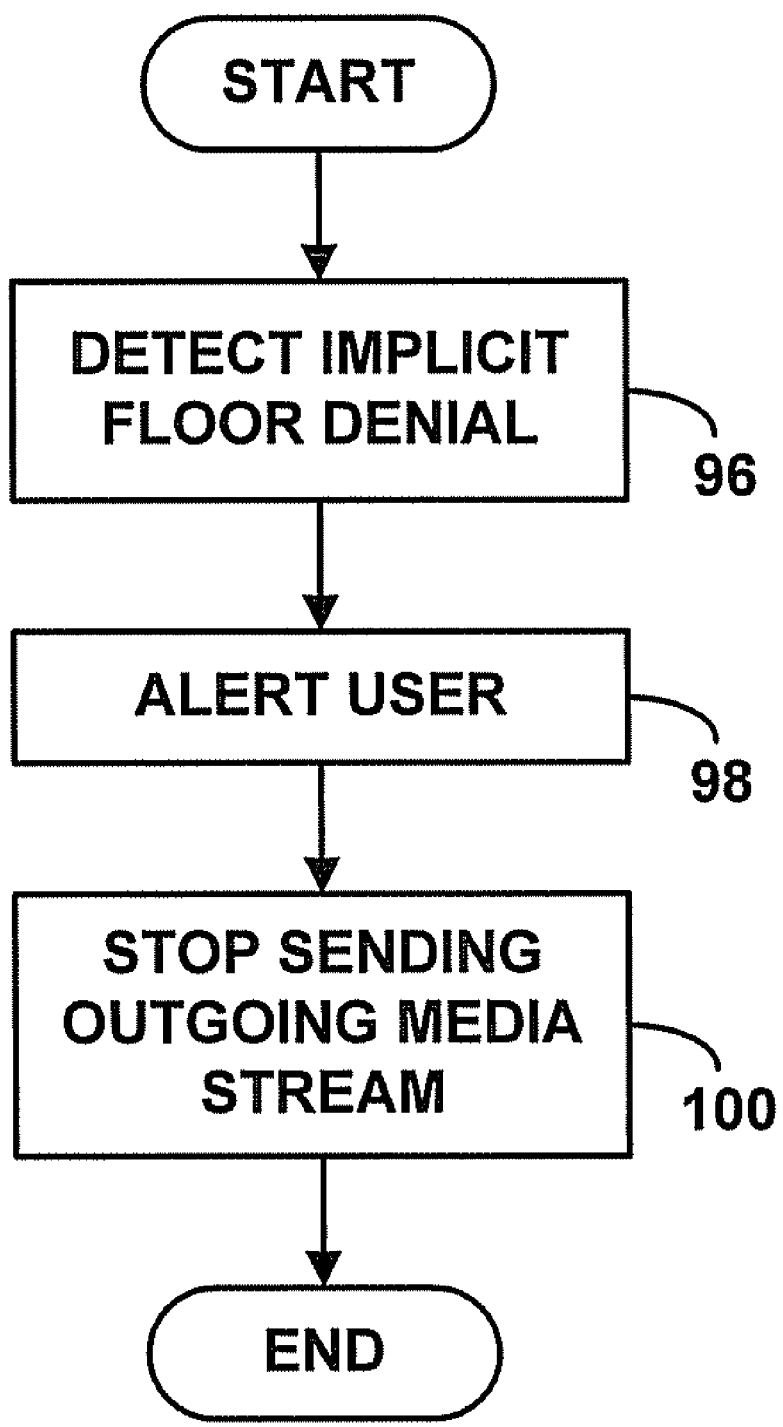

When the station detects an implicit floor denial like this, the station can then notify the user of the floor denial, and the station would preferably stop sending the outgoing RTP stream to the server. FIG. 10 depicts an example of this process, where the station takes both of these actions in response to an implicit floor denial.

As shown in FIG. 10, at step 96, the station detects an implicit floor denial. In response, at step 98, the station alerts the user who requested the floor. Also in response, at step 100, the station stops sending the outgoing RTP stream to the server.

Note that a station can also voluntarily release the floor when the user of the station is finished speaking, such as when the user releases a floor-control button or otherwise signals a desire to release the floor. To release the floor, the station could then responsively send a signal of some sort to the server (such as a predefined code or bit in an RTP header, for instance).

c. Implicit Floor Control at the Communication Server

Figure 11:
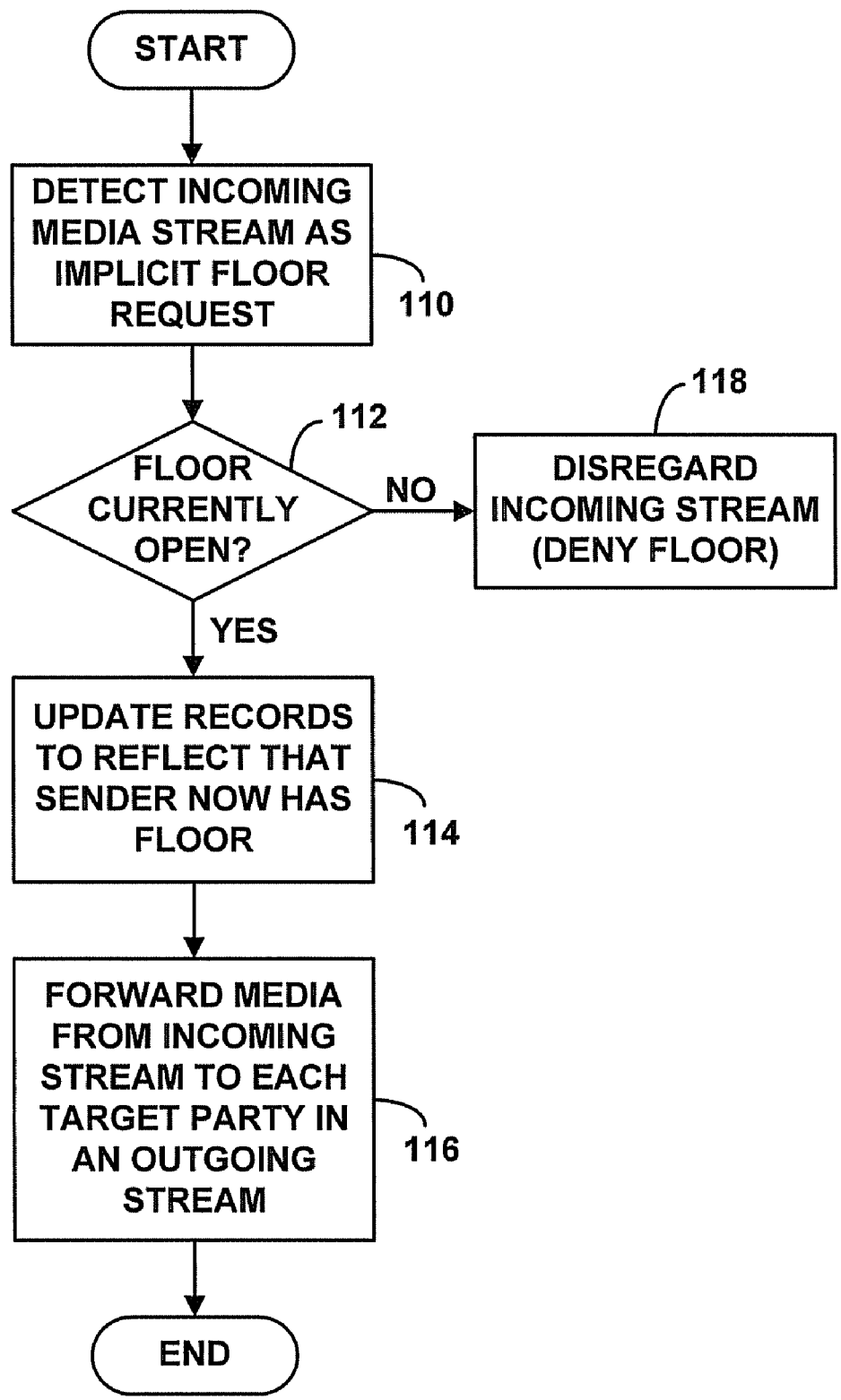
FIG. 11 is a flow chart depicting functions that an exemplary communication server can carry out in accordance with the exemplary embodiment.

As further noted above, the exemplary communication server 22 can be arranged to carry out implicit floor control by receiving implicit floor requests, granting the floor in response to an implicit floor request when the floor is currently open, and implicitly denying the floor by disregarding an implicit floor request when the floor is not currently open. FIG. 11 depicts an example of this process.

As shown in FIG. 11, at step 110, the exemplary server detects that it is receiving an incoming RTP stream from a user station (such as station 12, 14 or 16), which the server treats as an implicit floor request. In response, at step 112, the server determines whether the floor is currently open. For instance, processor 40 may consult data storage 42 to determine whether any station currently holds the floor.

If the server determines that the floor is currently open, then the server responds to the implicit floor request by granting the floor to the requesting station (i.e., station and/or user), and updating its records in data storage 42. Thus, at step 114, the server may update its records in data storage 42 to reflect that the requesting station has the floor, and, at step 116, the server may begin to forward the media carried by the incoming RTP stream to each other participating station in an outgoing RTP stream.

On the other hand, if the server determines that the floor is not currently open, i.e., that another station currently holds the floor, then, at step 118, the server implicitly denies the floor request by disregarding the incoming RTP stream (i.e., not forwarding the media and not responding to the requesting station). In other words, the server does not forward the media in the incoming RTP stream to the other participant(s). Optionally, the server may also send an express floor-denial message to the requesting station.

Note also that when the floor is released, the server can send a signal of some sort to each participating station, to alert the station(s) that the floor has been released. (For instance, the signal could be a predefined code or bit in an RTP header.)

3. Operation in a Full-Duplex Session

As described above, the exemplary embodiment is particularly advantageous in a half-duplex conference session, where a communication server outputs media at any given time from only the station that has the floor. However, the exemplary embodiment can be extended to apply in a full duplex session as well, provided that the notion of a "floor" exists in the session.

In a full-duplex session, as noted above, a communication server may output media from more than one participating station concurrently, so that participants can effectively talk and listen at the same time. In particular, the server could receive media from multiple participating stations, mix the underlying media together to produce combined media, and send to the participating stations a media stream that embodies the combined media. Participating stations would then be equipped to handle the simultaneous input and output of media.

In a full-duplex session, the communication server could still be arranged to grant the floor to just one participant at a time. Having the floor in the full-duplex session, however, could have different meaning than having the floor in a half-duplex session. For instance, rather than outputting media from only the station that has the floor (as in a half-duplex session), the communication server could be arranged to output media more loudly from the station that has the floor than from each other participating station. That is, when the server mixes together the media from various participating stations, the server could attenuate the media from each station that does not hold the floor or could amplify the media from the station that holds the floor.

Thus, applying the exemplary embodiment in the full-duplex scenario, the server may still grant the floor to a station in response to receipt of a media stream from the station, provided that no other participating station currently holds the floor. And the server may refuse to grant the floor to a station in response to receipt of media from the station, if another participating station currently holds the floor.

Figure 12:
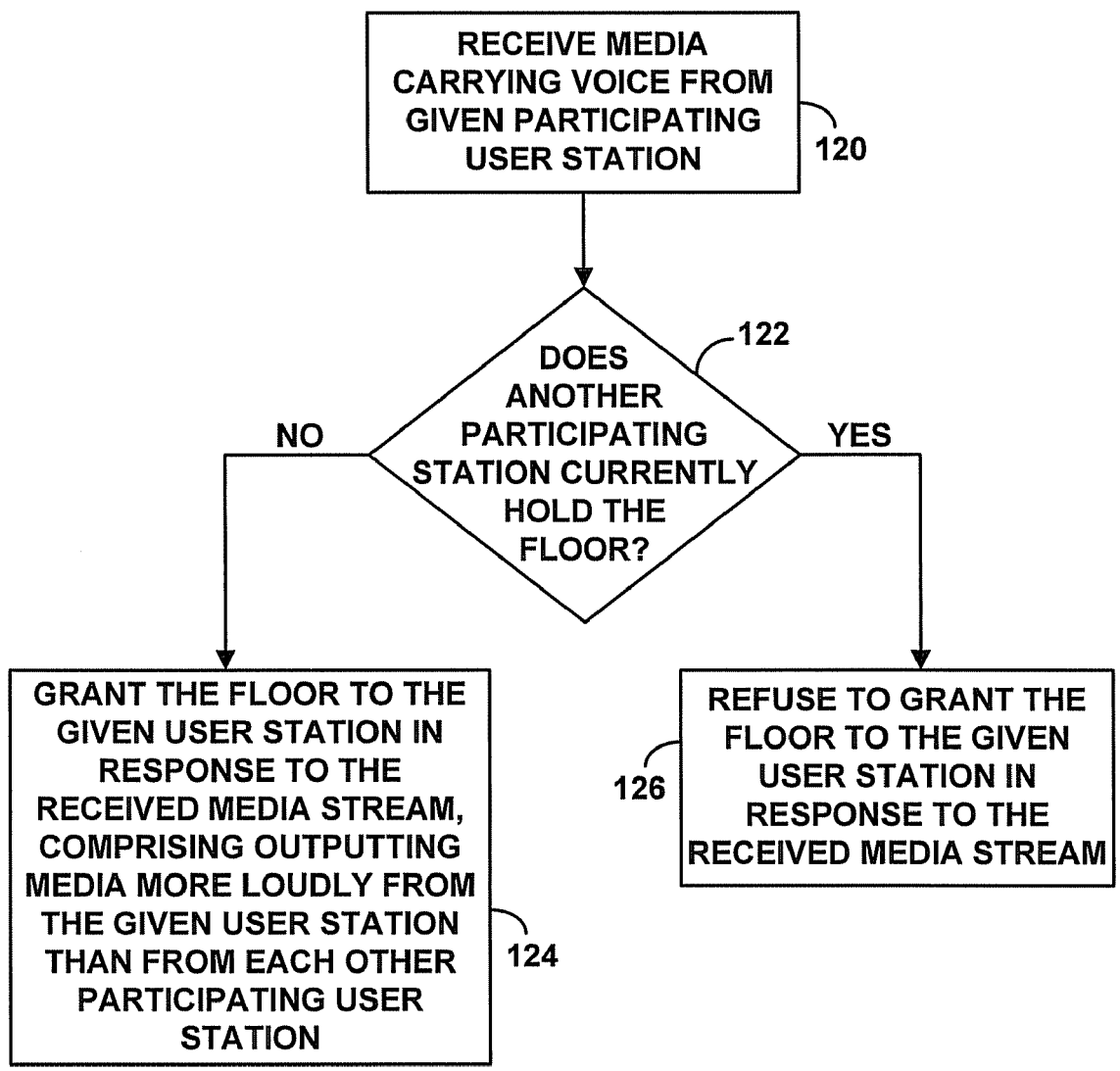
FIG. 12 is a flow chart depicting functions that an exemplary communication server can carry out in accordance with the exemplary embodiment.

FIG. 12 depicts an example of this process. As shown in FIG. 12, at step 120, the communication server receives a media stream carrying voice from a given user station of the plurality of user stations engaged in a real-time packet-based media session via the communication server. At step 122, the communication server determines if another participating station in the session currently holds the floor. If not, then, at step 124, the communication server grants the floor to the given user station in response to the received media stream, wherein granting the floor to the given user station comprises outputting media more loudly from the given user station than from each other participating user station, while still outputting media from one or more other participating user station. On the other hand, if so, then, at step 126, the communication server refuses to grant the floor to the given user station in response to the received media stream.

Further, the server could even be arranged to grant levels of floor to various participants in a full-duplex session. For example, the server could output most loudly the media from a station with a highest floor level, and the server could incrementally attenuate the media that it outputs from each other participating station having a successively lower floor level.

According to the exemplary embodiment, the server can accomplish this by granting the highest floor level to the first station from which the server receives a media stream when no other station currently holds the floor, granting the next floor level to the next station from which the server receives a media stream when the first station currently holds the highest floor level, and so forth. As a station releases its control over a given floor level, the server could then responsively increment the floor levels of other stations that hold some level of the floor.

4. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. A floor control method for a full-duplex packet-based real-time media session in which a plurality of user stations exchange media via a communication server on a packet-switched network, the floor control method comprising:
   in the full-duplex packet-based real-time media session, the communication server outputting media from more than one of the user stations concurrently, to allow session participants to talk and listen at the same time; and
   in the full-duplex packet-based real-time media session, the communication server granting a floor of the session to just one of the user stations at a time, so that just the one user station holds the floor at a time,
   wherein granting the floor to just one of the user stations at a time comprises the communication server outputting media more loudly from the one user station than from each other participating user station.

2. The method of claim 1, further comprising the communication server mixing together media from various participating user stations, wherein granting the floor to just one of the user stations at a time comprises:
   attenuating the media from each user station that does not hold the floor.

3. The method of claim 1, further comprising the communication server mixing together media from various participating user stations, wherein granting the floor to just one of the user stations at a time comprises:
   amplifying the media from the one user station.

4. The method of claim 1, further comprising:
   the communication server granting the floor to the one user station in response to receipt from the one user station of a media stream, provided that no other participating station currently holds the floor.

5. The method of claim 4, wherein granting the floor in response to receipt from the one user station of the media stream comprises granting the floor in response to receipt from the one user station of a Real-time Transport Protocol (RTP) media stream.

6. The method of claim 4, wherein the media stream carries a digital representation of voice provided by a user of the one user station.

7. The method of claim 1, further comprising:
   the communication server granting levels of floor to multiple participating user stations.

8. The method of claim 7, wherein granting levels of floor to multiple participating user stations comprises:
   the communication server outputting most loudly media from a user station with a highest floor level, and the communication server incrementally attenuating media that the communication server outputs from each other participating user station having a successively lower floor level.

9. The method of claim 8, wherein granting levels of floor to multiple participating user stations comprises:
   granting the highest floor level to the first user station from which the communication server receives a media stream when no other user station currently holds the floor; and
   granting a next floor level to a next user station from which the server receives a media stream when the first user station currently holds the highest floor level.

10. The method of claim 9, further comprising:
    as a particular user station releases control over a floor level held by the particular user station, the communication server incrementing a floor level respectively of each of one or more other user stations that holds some level of the floor.

11. A communication server operable to provide floor control for a full-duplex packet-based real-time media session in which a plurality of user stations exchange media via the communication server on a packet-switched network, the communication server comprising:
    a processor;
    a communication interface;
    data storage; and
    machine language instructions stored in the data storage and executable by the processor to carry out functions including:
    (i) outputting media from more than one of the user stations concurrently, to allow session participants to talk and listen at the same time,
    (ii) receiving a media stream from a given user station of the plurality of user stations, and
    (iii) in response to receipt of the media stream from the given user station, granting a floor of the session to the given user station if no other participating station currently holds the floor, and refusing to grant the floor to the given user station if another participating station currently holds the floor,
    wherein granting the floor to the given user station comprises the communication server outputting media more loudly from the given user station than from each other participating user station, while still outputting media from one or more other participating user stations.

12. The communication server of claim 11, wherein the functions further include:
    mixing together media from various participating user stations,
    wherein granting the floor to the given user station comprises attenuating the media from each user station that does not hold the floor.

13. The communication server of claim 11, wherein the functions further include:
    mixing together media from various participating user stations,
    wherein granting the floor to the given user station comprises amplifying the media from the given user station.

14. The communication server of claim 11, wherein receiving a media stream from the given user station comprises receiving a Real-time Transport Protocol (RTP) media stream from the given user station.

15. The method of claim 14, wherein the media stream carries a digital representation of voice provided by a user of the given user station.

16. An implicit floor control method for a full-duplex packet-based real-time media session in which a plurality of user stations exchange media via a communication server on a packet-switched network, the implicit floor control method comprising:
    in the full-duplex packet-based real-time media session, the communication server granting levels of floor to two or more user stations in response to receipt of media streams from the user stations and based on an order in which the communication server begins to receive the media streams from the user stations, wherein granting levels of floor to two or more user stations comprises granting a highest floor level to a first user station from which the communication server receives a media stream and granting a next floor level to a next station from which the communication server receives a media stream when the first user station currently holds the highest floor level, so that multiple stations concurrently hold levels of the floor.

17. The method of claim 16, wherein the communication server granting levels of floor to two or more user stations comprises:
   the communication server outputting most loudly media from a user station with a highest floor level; and
   the communication server incrementally attenuating media that the communication server outputs from each other participating user station having a successfully lower floor level.

18. The method of claim 17, wherein granting levels of the floor to two or more user stations comprises:
   granting the highest floor level to the first user station from which the communication server receives a media stream when no other user station currently holds the floor; and
   granting a next floor level to a next user station from which the server receives a media stream when the first user station currently holds the highest floor level.

19. The method of claim 18, further comprising:
   as a particular user station releases control over a floor level held by the particular user station, the communication server incrementing a floor level respectively of each of one or more other user stations that holds some level of the floor.

\* \* \* \* \*